United States Patent [19]

Cucheran et al.

[11] Patent Number: 5,794,827
[45] Date of Patent: Aug. 18, 1998

[54] VEHICLE ARTICLE CARRIER

[75] Inventors: John S. Cucheran, Lake Orion; Donald R. Potter, Clarkston; Artur K. Rak, Warren, all of Mich.

[73] Assignee: JAC Products, Inc., Ann Arbor, Mich.

[21] Appl. No.: 797,292

[22] Filed: Feb. 7, 1997

Related U.S. Application Data

[63] Continuation-in-part of Ser. No. 573,179, Dec. 15, 1995, abandoned.

[51] Int. Cl.$^6$ ..................................................... B60R 9/00
[52] U.S. Cl. ........................................... 224/321; 224/326
[58] Field of Search ................................. 224/321, 322, 224/323, 324, 325, 326, 327, 328, 329, 330, 309, 315, 319

[56] References Cited

U.S. PATENT DOCUMENTS

| | | |
|---|---|---|
| 4,406,386 | 9/1983 | Rasor et al. |
| 4,448,337 | 5/1984 | Cronce . |
| 4,469,261 | 9/1984 | Stapleton et al. |
| 4,500,020 | 2/1985 | Rasor . |
| 4,684,048 | 8/1987 | Bott . |
| 4,911,348 | 3/1990 | Rasor et al. |
| 4,982,886 | 1/1991 | Cucheran . |
| 5,170,920 | 12/1992 | Corrente et al. |
| 5,190,198 | 3/1993 | Cucheran . |
| 5,205,453 | 4/1993 | Pudney et al. |
| 5,326,007 | 7/1994 | Pudney et al. |
| 5,375,750 | 12/1994 | Mandarino et al. |
| 5,385,285 | 1/1995 | Cucheran et al. ............ 224/321 |
| 5,474,217 | 12/1995 | Mandarino et al. |
| 5,588,572 | 12/1996 | Cronce et al. |

Primary Examiner—David J. Walczak
Assistant Examiner—Timothy L. Maust
Attorney, Agent, or Firm—Harness, Dickey & Pierce, PLC

[57] ABSTRACT

A vehicle article carrier having a pair of side rails, at least one cross bar and a pair of bracket members secured at opposite ends of the cross bar for adjustably supporting articles thereon along said side rails. In one embodiment each bracket member includes a rotator having a circumferential camming surface which urges a locking member out of engagement with portions of the side rails to permit the cross bar to be adjustably positioned along the side rails. In another embodiment each bracket member includes a lever member which has a circumferential camming surface used for urging the locking member out of locking engagement with its associated side rail. In yet another embodiment each bracket member includes a slide member having a longitudinal camming surface. The slide member is moved longitudinally to urge the locking member into an open position to allow the bracket member to be adjustably positioned along the side rails. A plurality of arrangements are disclosed for securing the slide member to the bracket member while permitting sliding movement of the slide member.

14 Claims, 10 Drawing Sheets

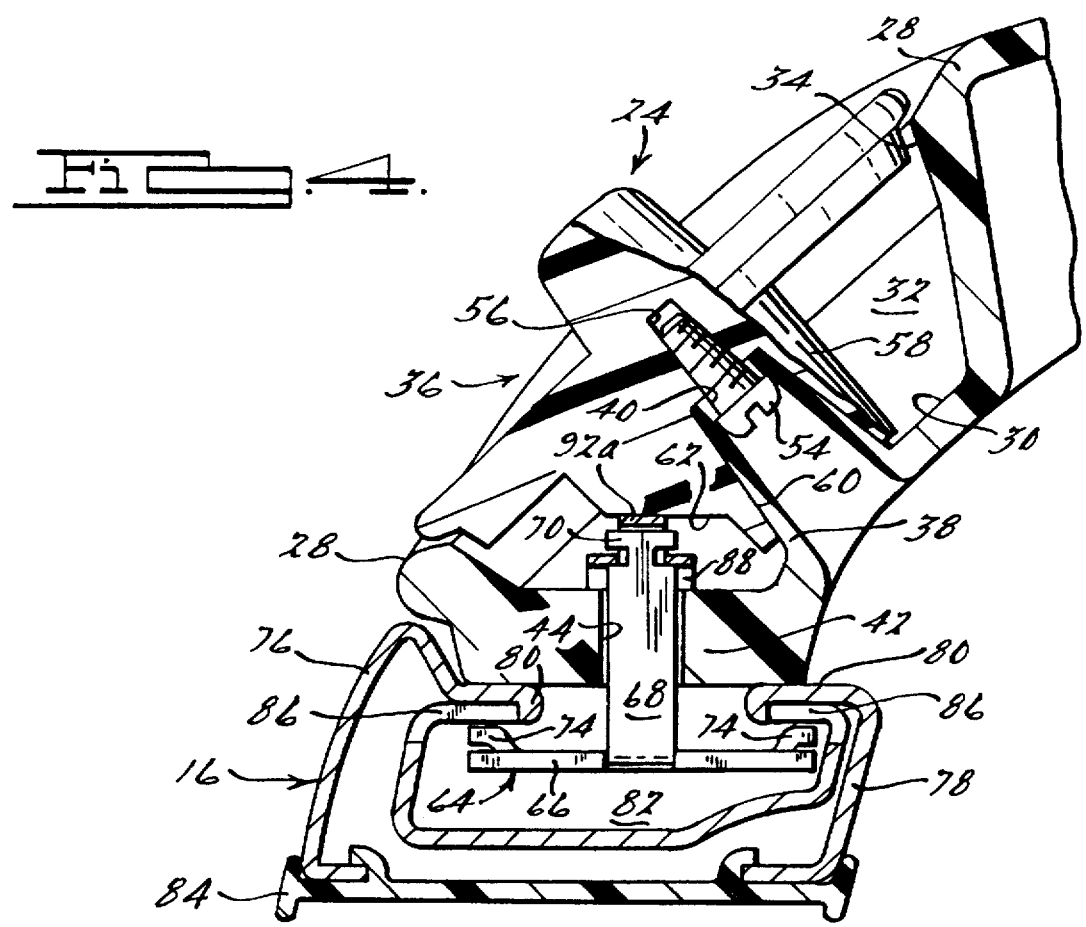
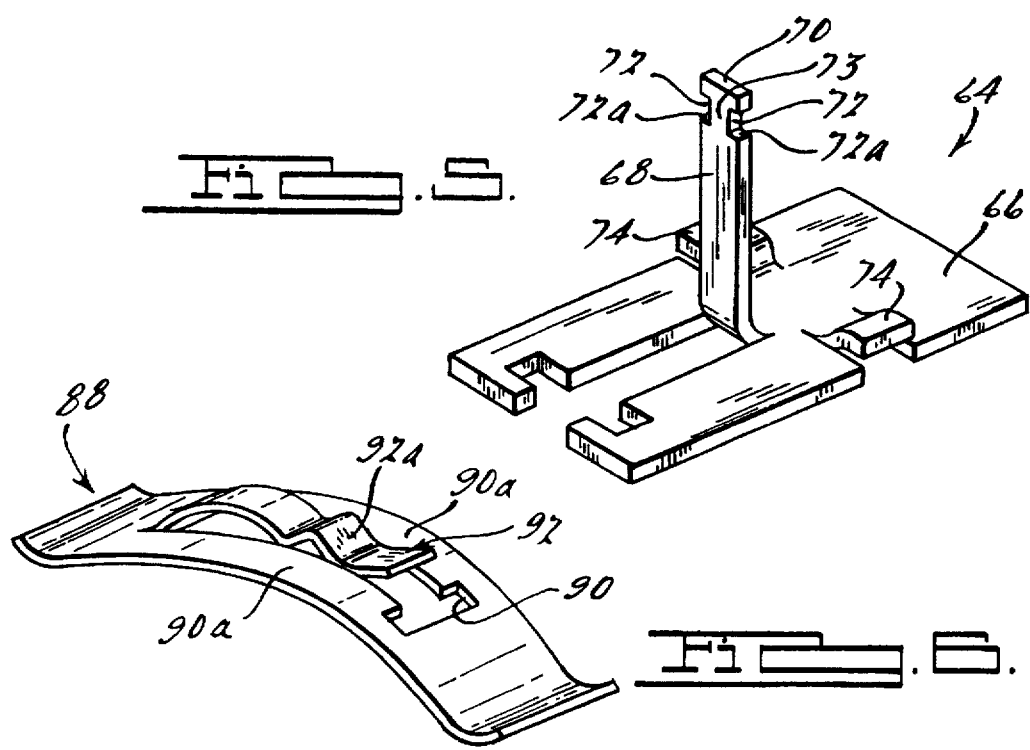

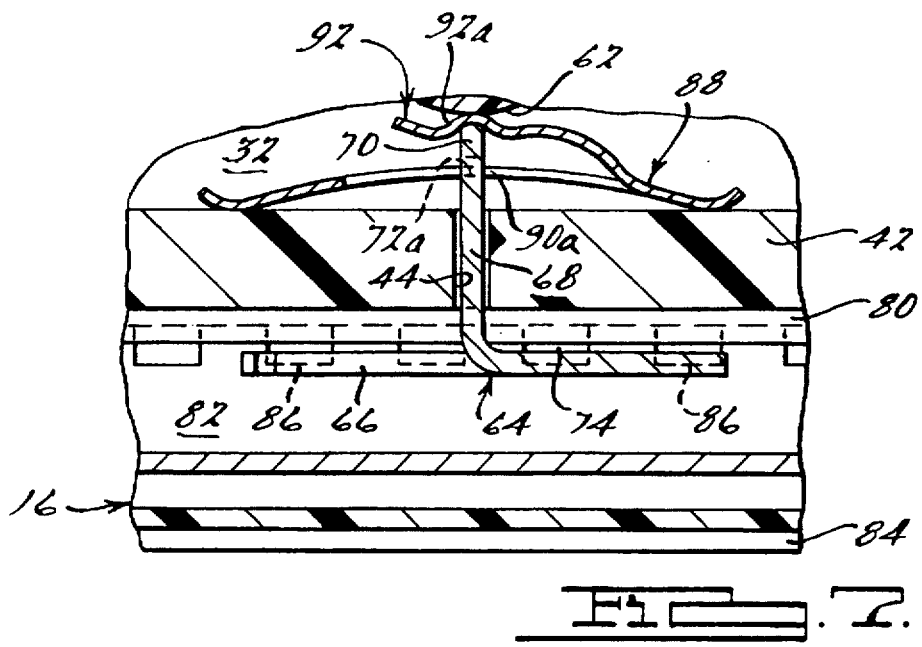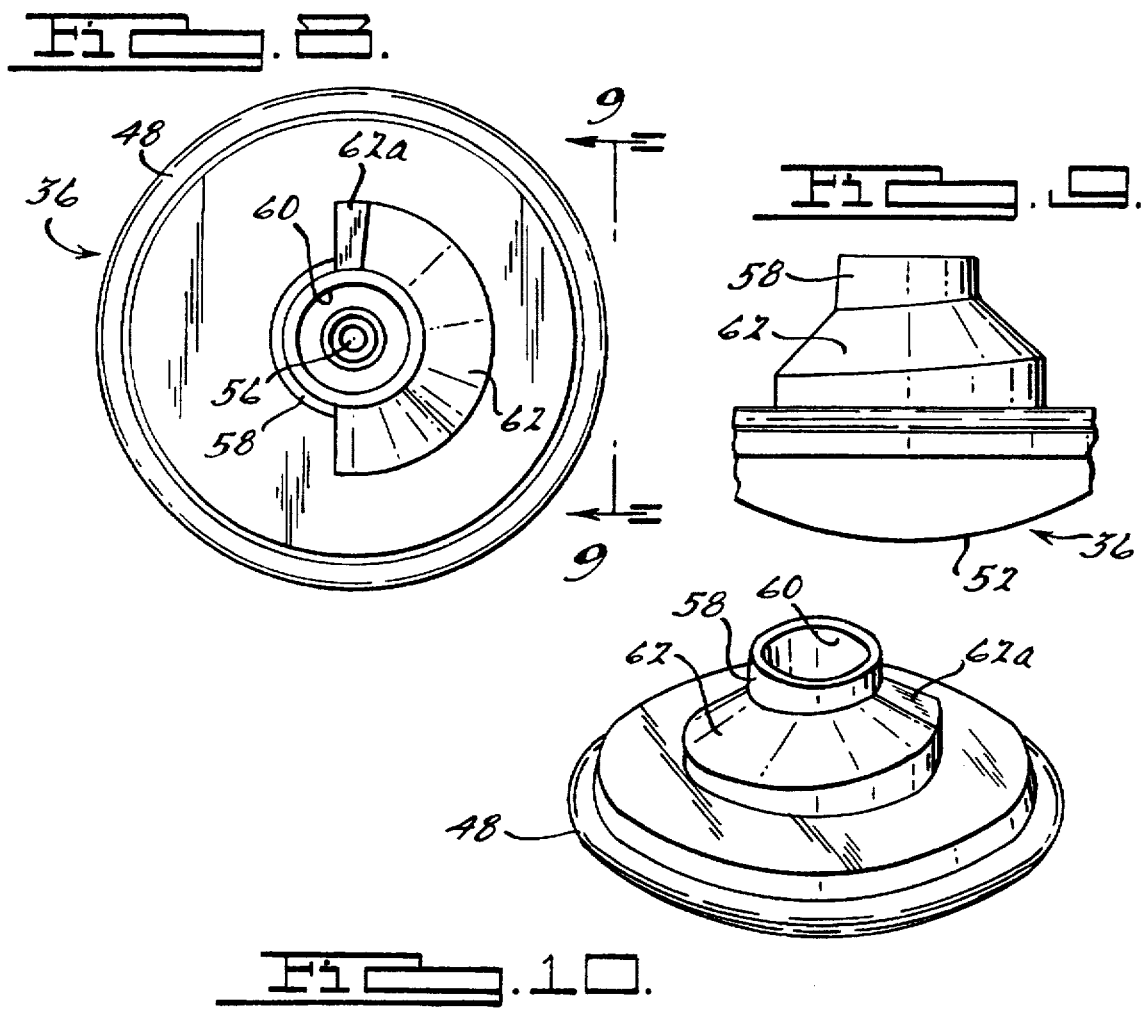

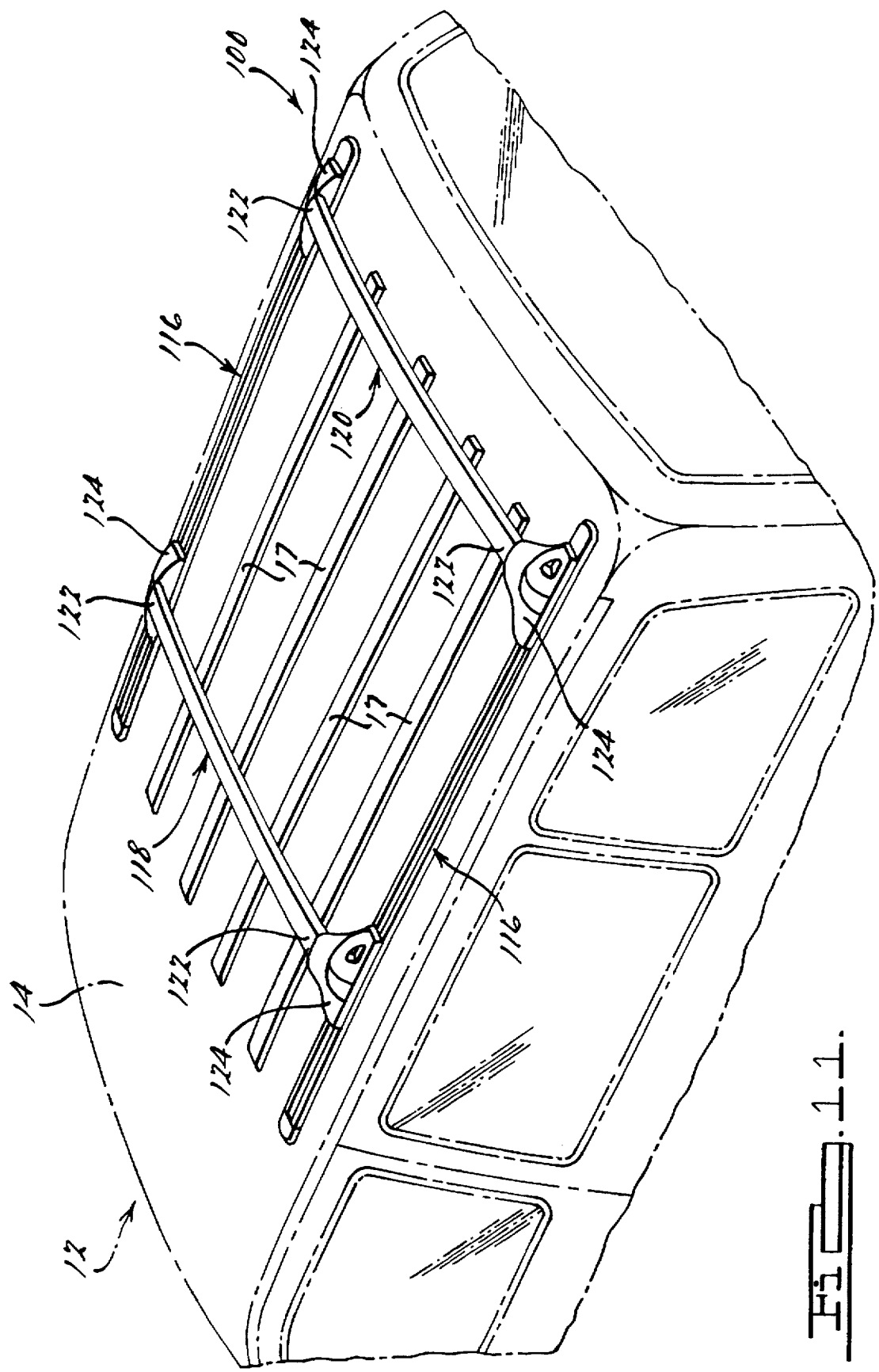

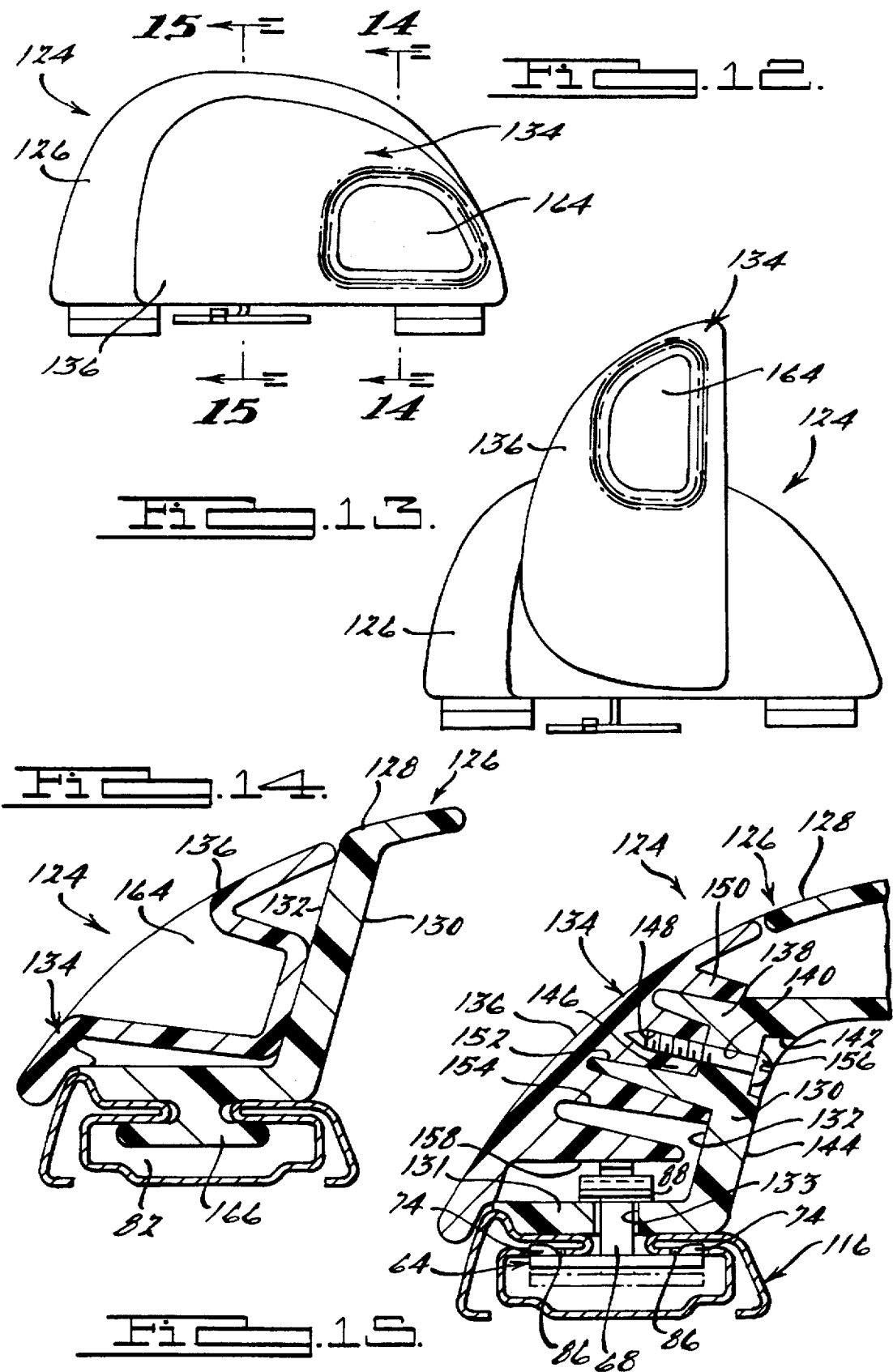

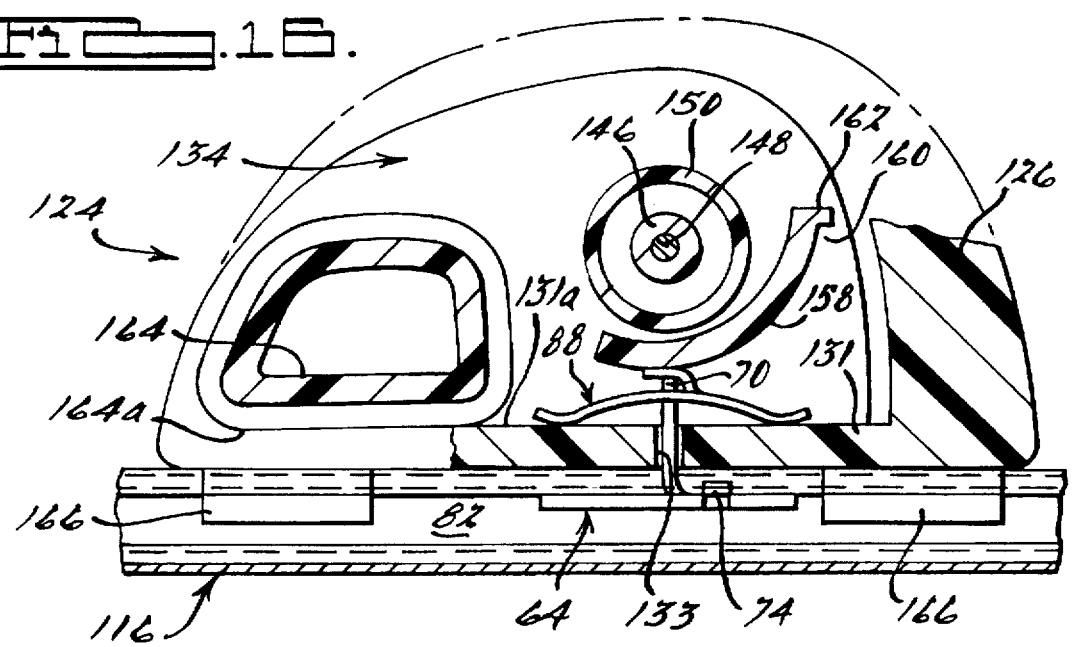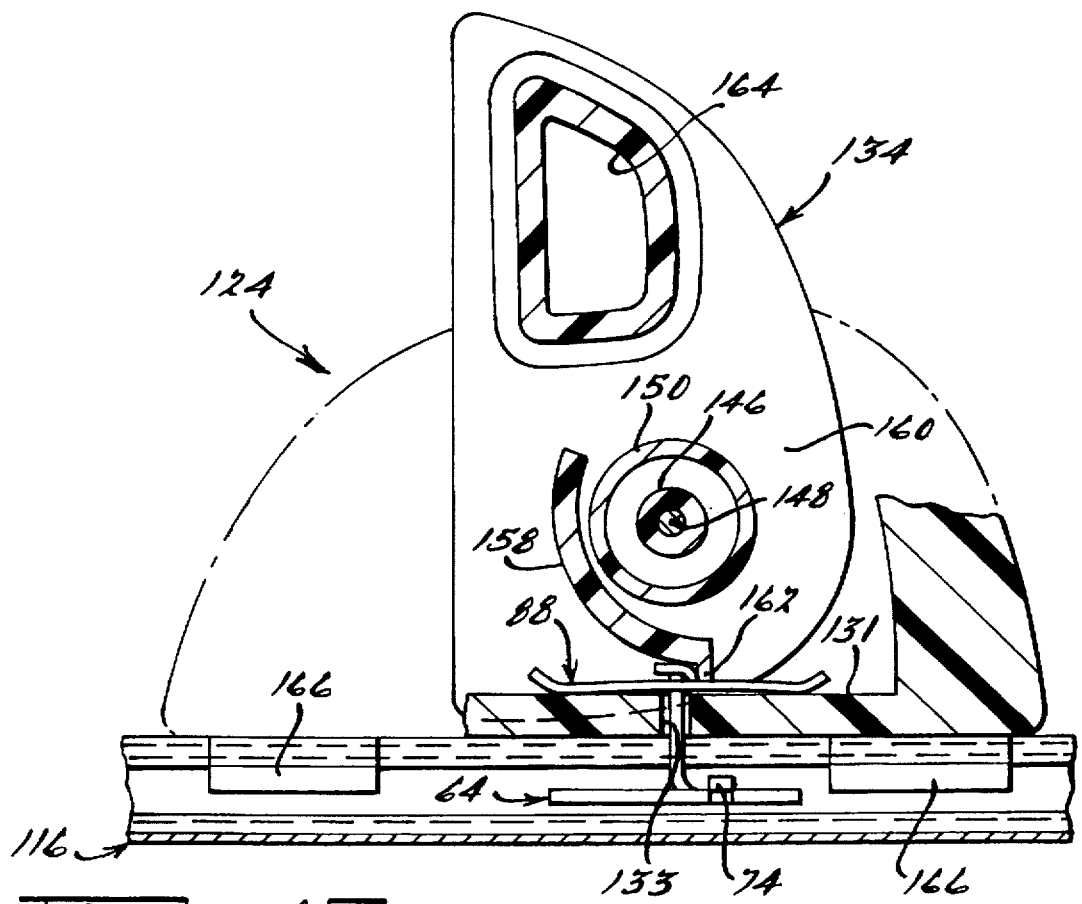

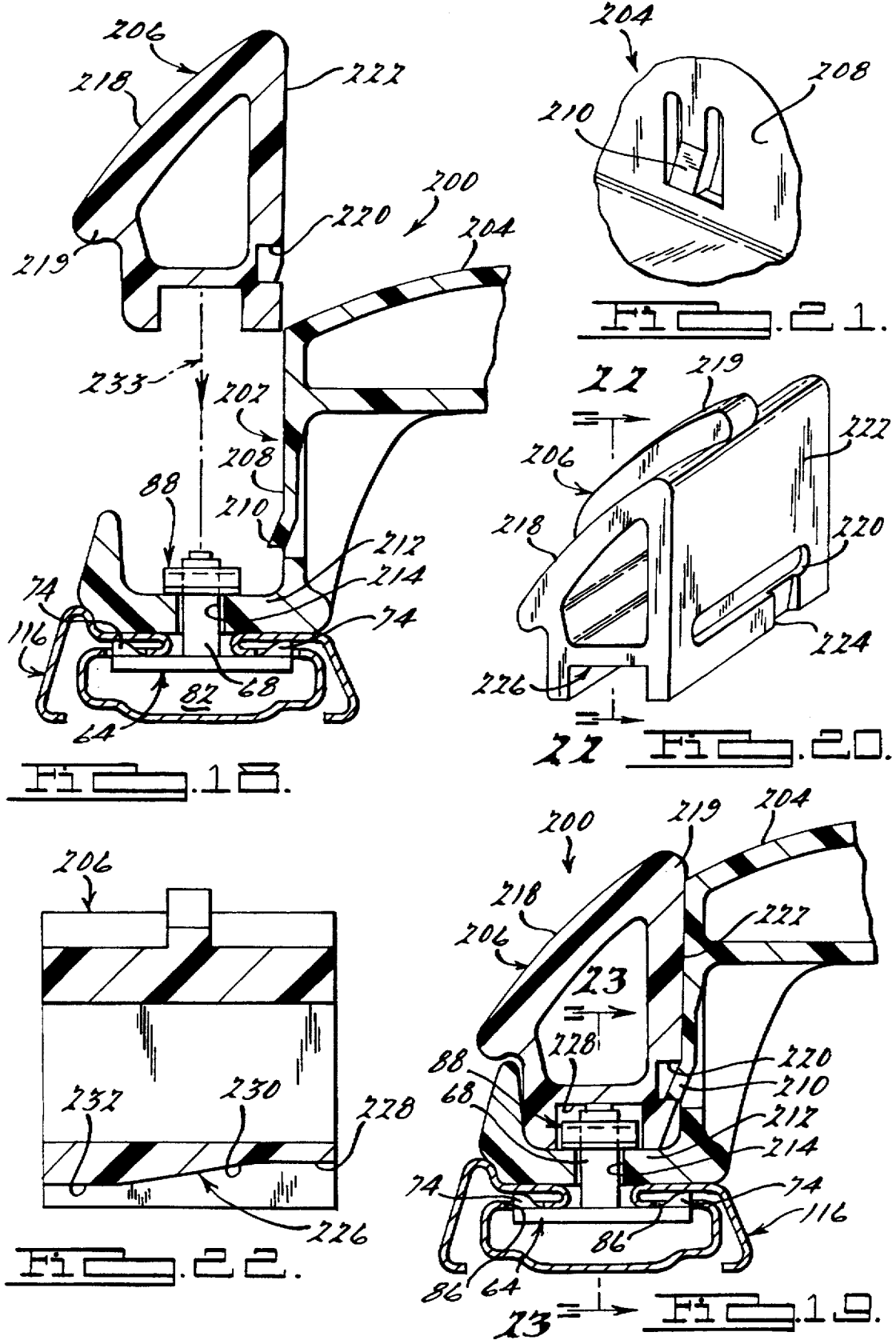

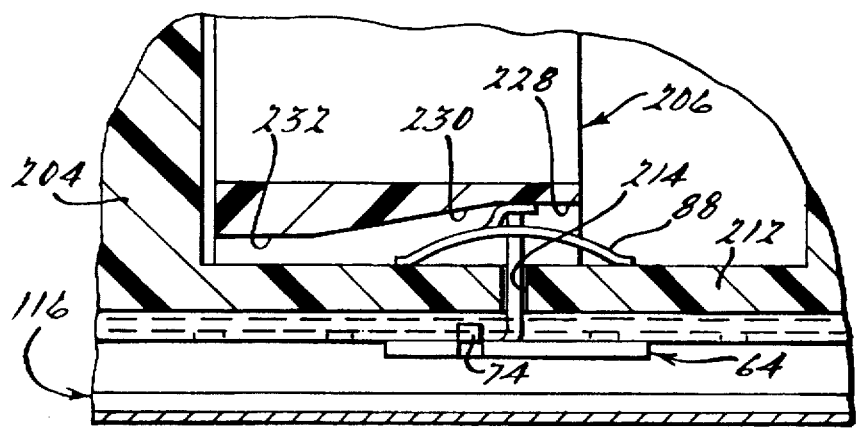
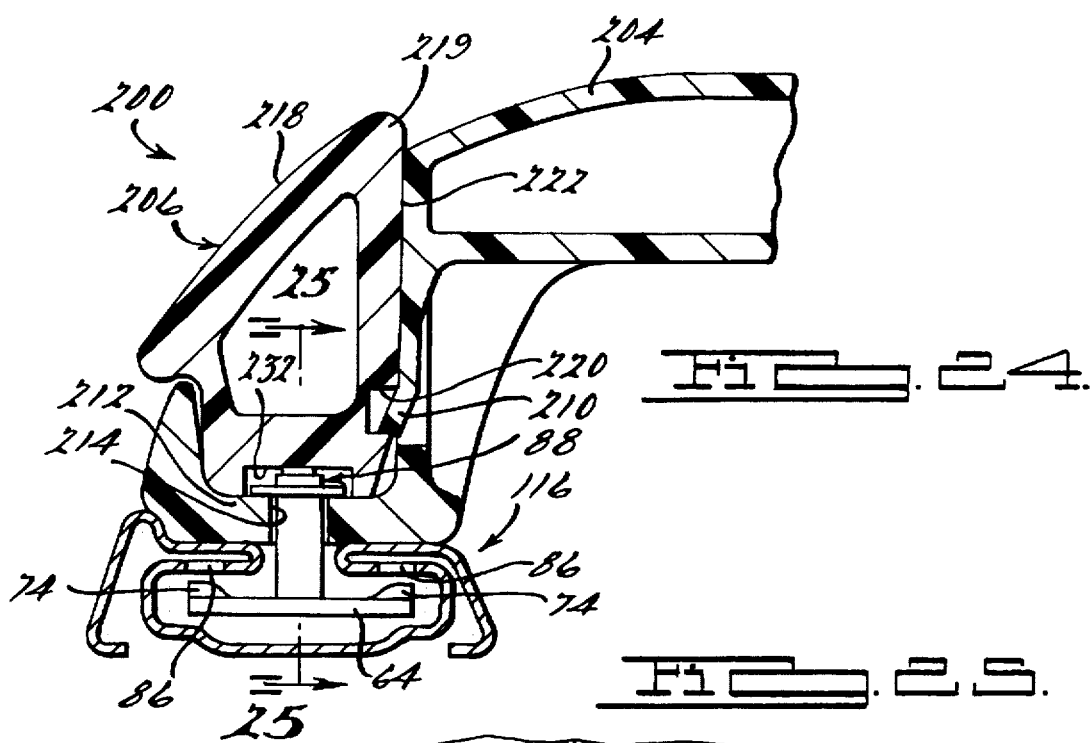
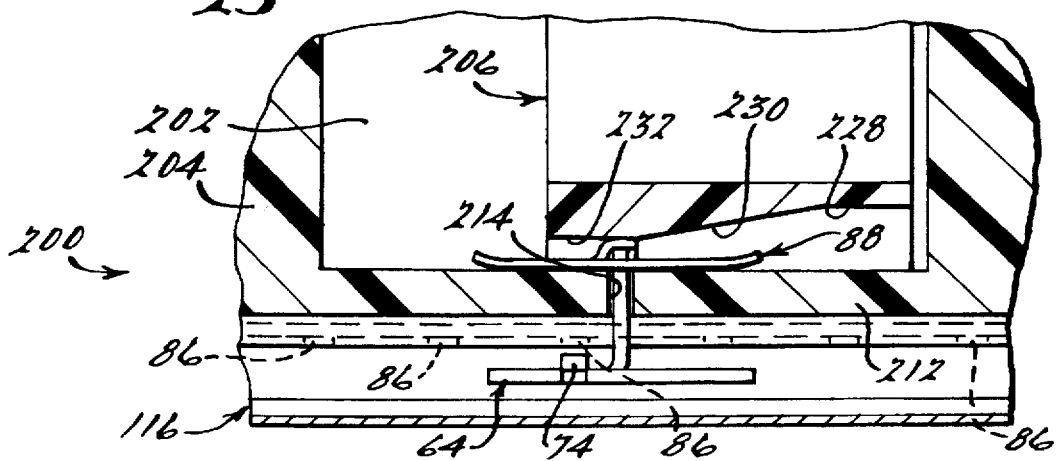

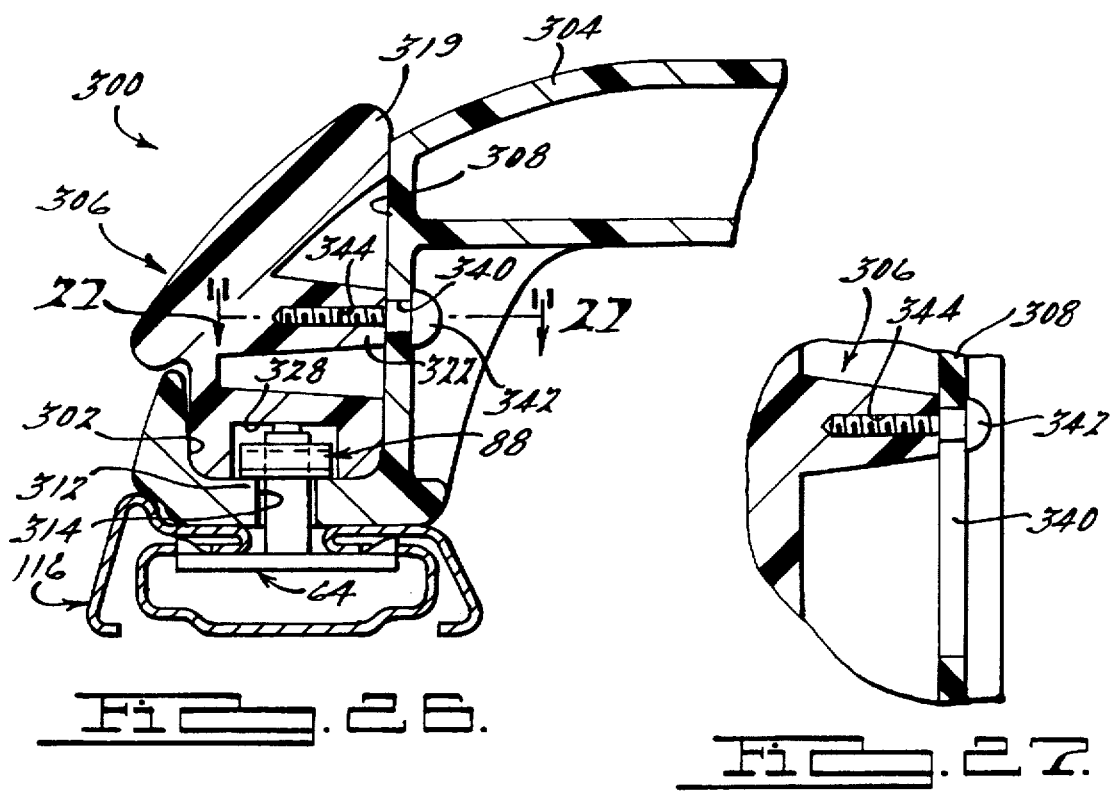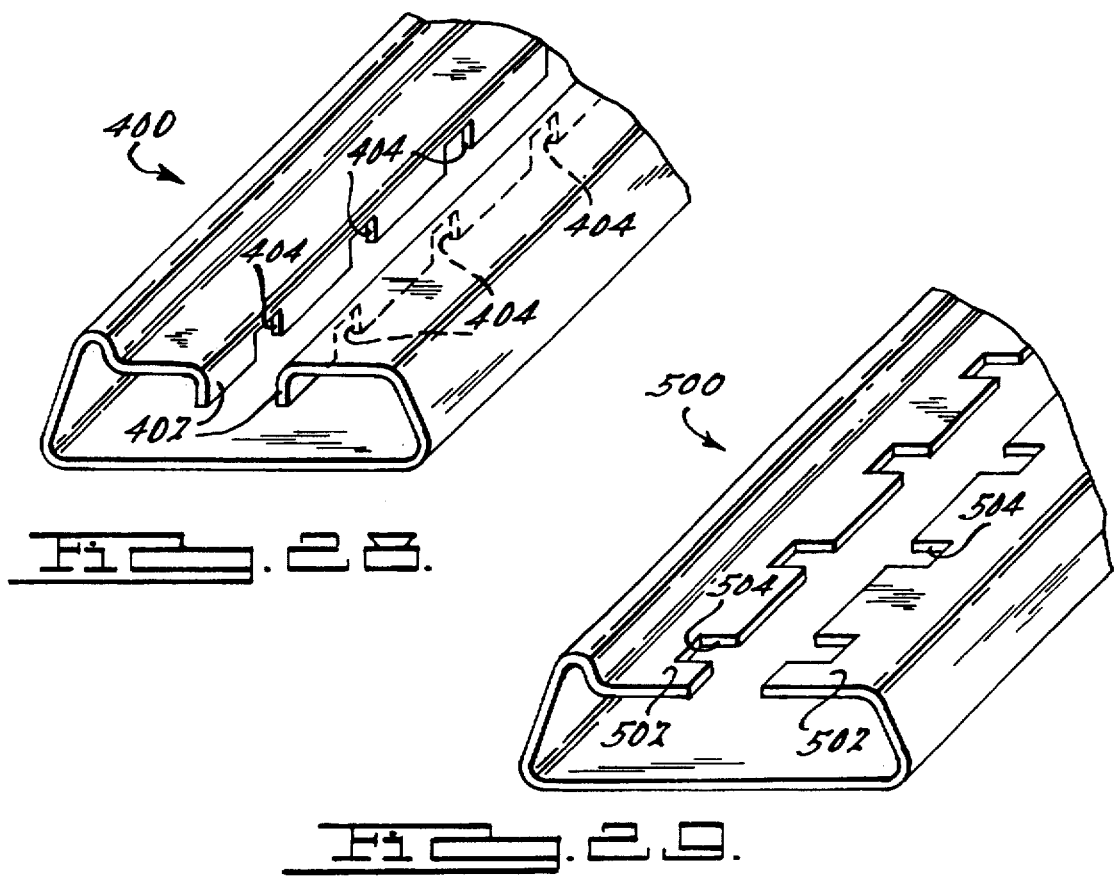

VEHICLE ARTICLE CARRIER

CROSS-REFERENCE TO RELATED APPLICATIONS

This present application is a continuation-in-part patent application of U.S. application Ser. No. 08/573,179, filed Dec. 15, 1995, and entitled "Vehicle Article Carrier", now abandoned.

BACKGROUND OF THE INVENTION

1. Technical Field

This invention relates to vehicle article carriers, and more particularly to an adjustable vehicle article carrier for supporting articles above an outer body surface of a vehicle such as a roof or deck lid of a vehicle.

2. Discussion

Vehicle article carriers are used in a wide-variety of applications to support a variety of articles above an outer body surface of a vehicle such as a roof or deck lid of the vehicle. Some vehicle article carriers are adjustable via one or more cross bars which may be adjustably positioned along a pair of raised side rails fixedly secured to an outer body surface of the vehicle. Such vehicle article carriers are shown in, for example, U.S. Pat. Nos. 4,684,048, 4,982,886 and 5,082,158, all assigned to the assignee of the present application.

The vehicle article carriers in use at the present time and those embodied in the above-mentioned U.S. patents have proven to be very useful for the purpose of transporting articles which are either too large or awkward to be transported within the interior of a vehicle. Nevertheless, there still remains a need for a vehicle article carrier having a means for adjusting the position of at least one cross bar of the carrier in a manner which is extremely simple in construction and requires only a minimum number of parts to accomplish locking of an adjustable cross bar at a desired location along a pair of side rails.

SUMMARY OF THE INVENTION

The above and other objects are provided by a vehicle article carrier in accordance with preferred embodiments of the present invention. In one preferred embodiment, the vehicle article carrier of the present invention includes a pair of outer side rails each having a channel formed therein, with each of the outer side rails being fixedly secured to an outer body surface of a vehicle and positioned generally parallel to one another. A cross bar is provided which has at its outermost ends a pair of bracket members fixedly secured thereto. The bracket members releasably engage with the outer side rails to allow the cross bar to be quickly locked in position on the side rails such that the cross bar is not moveable longitudinally along the outer side rails. Each bracket member also includes a manually actuable control which releases each bracket member from its outer side rail to allow the cross bar to be easily, slidably positioned along the outer side rails at a desired position in order to support articles of varying dimensions thereon.

In one preferred embodiment, each bracket member includes a recess formed in an outer surface thereof and an opening formed in a base portion. A neck portion of a locking member extends through the opening in the base portion into the recess. The locking member includes a base plate which is of dimensions enabling it to reside within the channel of an associated outer side rail and to move slidably within the channel when the bracket member is in an unlocked position. A rotator is positioned partially within the recess and rotatably mounted within the recess. The rotator includes a circumferential camming surface which is positioned to abuttingly engage a head portion of the locking member. A biasing member is also is positioned within the bracket member and is operably coupled to the neck portion to cause the locking member to be urged into abutting (i.e., clamping) engagement with the channel of the associated side rail when the rotator is in a "locked" position. When the rotator is rotated into an "unlocked" position, the camming surface urges the neck portion outwardly of the bracket member such that the base plate becomes disengaged (i.e., unclamped) within the channel, thereby allowing the bracket member to be slidably, adjustably positioned along the side rail while the rotator is held in the unlocked position. The rotator is constructed such that it may be engaged with two or more fingers of a hand of the user and easily rotated with a minimal degree of effort. The biasing member causes the locking member to be urged into locking engagement within the channel of the side rail once the rotator is released.

In the preferred embodiment, the channel of each outer side rail includes a pair of overhanging ledge portions which each have a plurality of holes formed therein in spaced-apart fashion. The base plate of the locking member also includes a pair of raised portions which are positioned to engage within a pair of the notches in the overhanging ledge portions when aligned with the pair of notches, and when the locking member is urged into the locked position by appropriate rotation of the rotator.

In the preferred embodiment, the rotator includes a pair of depressions formed on opposite sides of a central member and is positioned within the recess such that it is substantially flush with an outer surface of the bracket member. The depressions allow the fingers of a hand to easily grasp the central member to rotate the rotator. In an alternative preferred embodiment a lever member is incorporated which is rotationally mounted to the bracket member. The lever member includes a circumferential camming portion which urges the locking member linearly into an unlocked position when the lever member is rotated to an open or unlocked position, and which permits the biasing member to urge the locking member into a locked position when the lever member is rotated into a closed or locked position.

In another alternative preferred embodiment, a slide member is positioned slidably within a recess formed in the bracket member. The slide member includes a longitudinal camming surface and is moveable slidably longitudinally to urge the locking member from a locked to an unlocked position to allow the biasing member to urge the locking member back into a locked position when the slide member is moved into a closed or locked position. In one preferred form, the slide member is retained within the recess of the bracket member by a flexible, protruding tongue portion formed on an interior wall of the bracket member which engages within a longitudinally extending slot formed in the slide member. Once the slide member is assembled into the recess, it can be moved slidably longitudinally but cannot be lifted out of the recess of the bracket member. In another preferred form the slide member is retained within the recess of the bracket member by an independent fastening member which extends through a slot formed in a wall of the bracket member and fixedly into an interior surface wall portion of the slide member. In this manner, once assembled in the recess of the bracket member the slide member can be moved slidably in accordance with the length of the slot formed in the wall of the bracket member but cannot be removed from the recess.

The preferred embodiments thus include a minimum number of moving parts to accomplish convenient locking and unlocking of the bracket member at desired locations along the length of an associated side rail. The clamping engagement provided by the locking member of each bracket member and the engagement of the raised surfaces with a corresponding pair of the notches in the channel member serve to provide extremely secure clamping of the cross bar at a large plurality of desired locations along the side rails.

BRIEF DESCRIPTION OF THE DRAWINGS

The various advantages of the present invention will become apparent to one skilled in the art by reading the following specification and subjoined claims and by referencing the following drawings in which:

FIG. 4 is a side cross-sectional view of the bracket member and the side rail showing the bracket member in an unlocked position;

FIG. 5 is a perspective view of the locking member of the present invention;

FIG. 6 is a perspective view of the biasing member of the present invention;

FIG. 7 is a cross-sectional view taken in accordance with section line 7—7 in FIG. 3 showing the bracket member in the locked position;

FIG. 8 is a bottom view of the rotator;

FIG. 9 is a view of the rotator taken in accordance with directional line 9—9 in FIG. 8 showing a portion of the camming surface thereof; and FIG. 10 is a perspective view of the rotator;

FIG. 11 is a perspective view of a vehicle on which a vehicle article carrier in accordance with an alternative preferred embodiment of the present invention is mounted;

FIG. 12 is a side view of one bracket member of the vehicle article carrier shown in FIG. 11 showing the lever member of the bracket member in the locked or closed position;

FIG. 13 is a view of the bracket member of FIG. 12 showing lever member in an open or unlocked position;

FIG. 14 is a cross-sectional view of the bracket member in accordance with section line 14—14 in FIG. 12;

FIG. 15 is a cross-sectional view in accordance with section line 15—15 in FIG. 12 illustrating the bracket member in the locked position;

FIG. 16 is a view of an inside surface of the lever member of one of the bracket members showing the bracket member in the locked position;

FIG. 17 is a view of the bracket member of FIG. 16 with the bracket member in the unlocked position;

FIG. 18 is an exploded cross-sectional view of an alternative preferred embodiment of the bracket member of the present invention;

FIG. 19 is a cross-sectional view of the bracket member of FIG. 18 in the locked position;

FIG. 20 is a perspective view of the slide member used with the bracket member of FIGS. 18 and 19;

FIG. 21 is a perspective view of the tab used to hold the slide member within the recess in the bracket member housing;

FIG. 22 is a partial cross-sectional view of the slide member in accordance with section line 22—22 in FIG. 20;

FIG. 23 is a partial side cross-sectional view in accordance with section line 23—23 in FIG. 19 showing the slide member and the locking member both in their locked positions;

FIG. 24 is a view of the bracket member of FIG. 19 in the unlocked position;

FIG. 25 is a partial side cross-sectional view in accordance with section line 25—25 in FIG. 24 of the locking member and the slide member in the unlocked position;

FIG. 26 is a side cross-sectional view of an alternative preferred embodiment of the bracket member of FIGS. 18–25;

FIG. 27 is a cross-sectional view of a portion of the bracket member of FIG. 26 in accordance with section line 27—27 in FIG. 26;

FIG. 28 is a perspective view of a portion of an alternative preferred form of the outer side rail of the vehicle article carrier; and FIG. 29 is a perspective view of another alternative preferred form of the outer side rail.

DETAILED DESCRIPTION OF THE PREFERRED EMBODIMENTS

Figure 1:
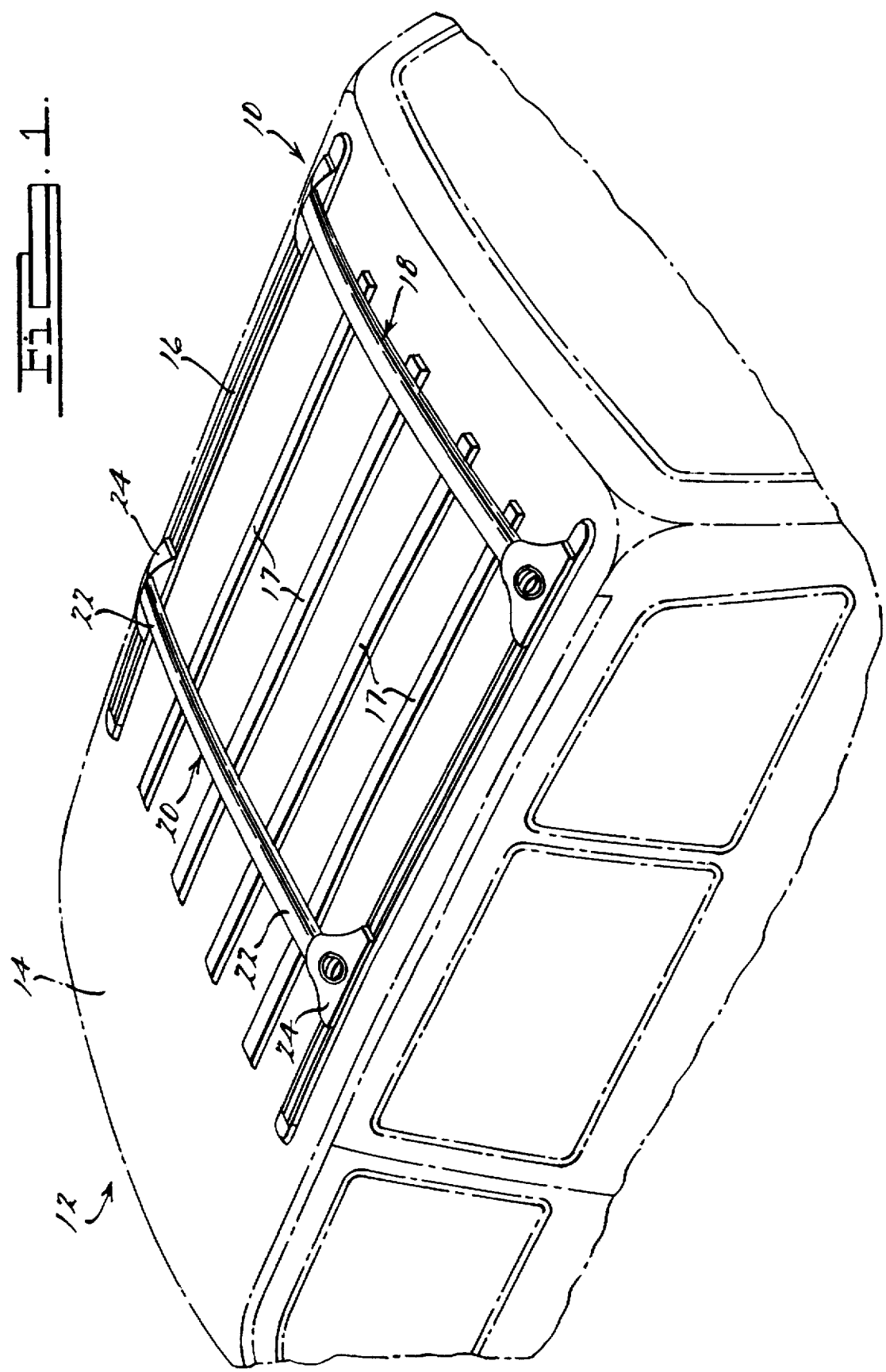
FIG. 1 is a perspective view of a portion of a vehicle showing a preferred embodiment of the vehicle article carrier of the present invention secured to an outer body surface of the vehicle.

Referring to FIG. 1, there is shown a vehicle 12 having an outer body surface 14 upon which a vehicle article carrier 10 in accordance with the present invention is mounted. The vehicle article carrier 10 comprises a pair of outer side rails 16 fixedly secured to the outer body surface 14 and positioned generally parallel to one another. The outer side rails 16 are also positioned so as to extend along a major length of the outer body surface 14. Optionally, a plurality of intermediate slats 17 could be provided and secured to the outer body surface 14. A fixed across bar 18 is provided as is an adjustable cross bar 20. It will be appreciated, however, that two adjustable cross bars 20 could just as readily be provided but that in most applications it is anticipated that only one of the two cross bars will need to be adjustable. The adjustable cross bar 20 has outermost end portions 22 to which are fixedly secured a pair of bracket members 24. The bracket members 24 are adjustably positionable along the length of each of their respective outer side rails 16 to enable the cross bar 20 to be positioned relative to the cross bar 18 as needed to support variously sized articles thereon.

Figure 2:
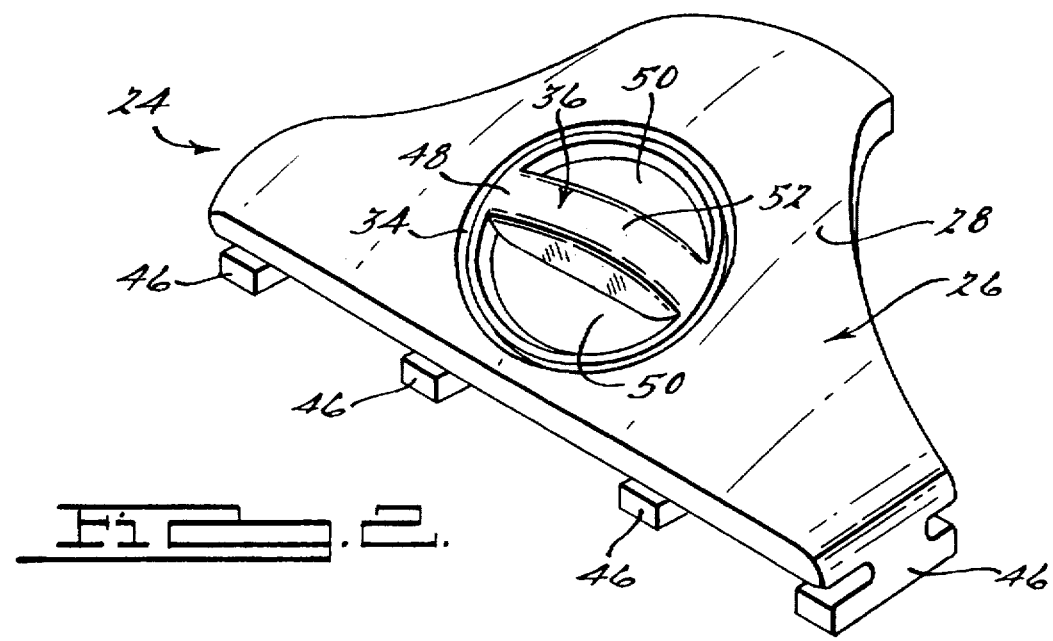
FIG. 2 is a perspective view of the bracket member.
Figure 3:
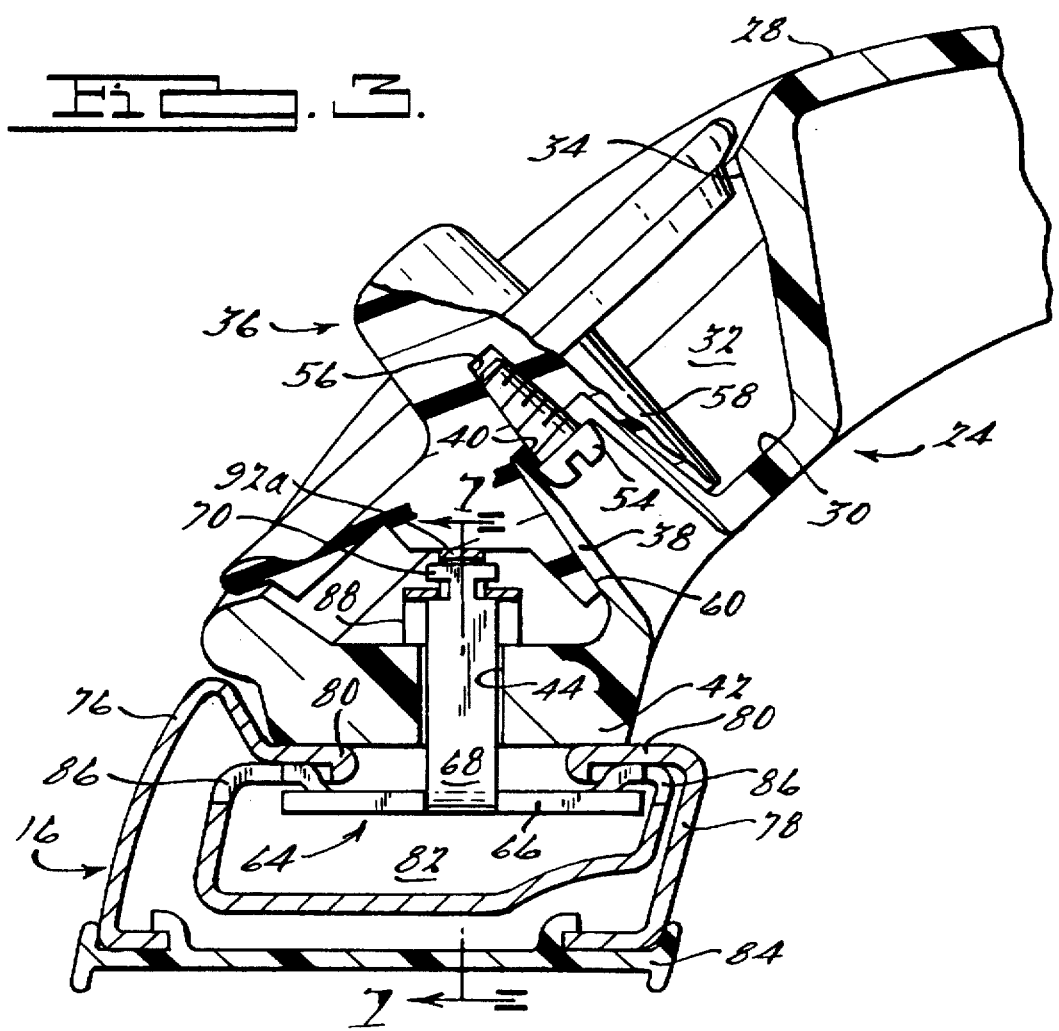
FIG. 3 is a cross-sectional view taken in accordance with section line 3—3 in FIG. 1 showing the internal structure of the bracket member and the side rail in cross-section with the locking member in a locked position.

Referring to FIGS. 2 and 3, one of the bracket members 24 is shown in greater detail. With specific reference to FIG. 3, each bracket member 24 includes a housing 26 having an outer surface 28 and an inner surface 30. The outer surface 28 includes a hollowed out portion or recess 32 formed in part by a generally circular opening 34. A rotator 36 is positioned in the recess 32 and is of a generally circular configuration having a diameter just slightly smaller than the circular opening 34 so as to fit within the circular opening 34 when assembled to the housing 26.

With further reference to FIG. 3, the inner surface 30 of the housing includes an integrally formed mounting post 38 which extends generally perpendicularly from the inner surface 30. The mounting post 38 includes a centrally disposed opening in the form of a bore 40. Both the mounting post 38 and the bore 40 are disposed so as to be at the approximate geometric center of the circular opening 34. The housing 26 further includes a base portion 42 having an opening in the form of a bore 44 extending therethrough. A plurality of foot portions 46 (visible in FIG. 2) are also integrally formed with the base portion 42. The cross bar 20 (FIG. 1) is fixedly secured to the housing 26 via one or more threaded screws (not shown) in conventional fashion such that the cross bar 20 and the bracket members 24 form a rigid, sturdy and unitary member.

With further reference to FIG. 2, the rotator 36 includes an outer surface 48 having a pair of depressions or recesses 50 formed on opposite sides of a central member 52. Thus, the rotator 36 can be easily rotated manually by a user by gripping the central member 52 with two or more fingers of a hand and turning the rotator 36 either clockwise or counterclockwise.

Referring again to FIG. 3, the bracket member 24 can be seen in the locked position. The rotator 36 is secured to the mounting post 38 by a threaded screw 54 or other similar fastening member which extends through the bore 40 and threadably engages within an opening 56 in the rotator 36. The rotator 36 also includes a centrally disposed boss portion 58 having an opening 60 which receives the mounting post 38. In this manner, the rotator 36 is free to rotate about the mounting post 38 while being secured thereto. It will be appreciated that any form of attachment of the rotator 36 to the mounting post could be used provided it allows for easy rotation of the rotator 36.

With further reference to FIGS. 3 and 8–10, the construction of the rotator 36 can be seen in even greater detail. The rotator 36 includes a camming surface 62 extending circumferentially around a portion of the opening 60. The camming surface 62 includes a flat portion 62a (visible in sections 8 and 10), the function of which will be described momentarily. With specific reference to FIGS. 9 and 10, the slope of the camming surface 62 is clearly apparent. It will be appreciated also that while the camming surface 62 is shown as extending approximately 180° around the opening 60, that the camming surface 62 could be of a greater or lesser arc of travel. For example, the camming surface 62 could be formed to extend over a 90° arc of travel, which would obviously require a more pronounced (i.e., steeper) slope. It is anticipated that the 180° arc of travel of the camming surface, as indicated in FIG. 8, will be most desired to provide a convenient and comfortable locking and unlocking action of the rotator 36.

With further reference to FIG. 3, the bracket member 24 can be seen to include a locking member 64 which extends through the bore 44. With brief reference to FIG. 5, the locking member 64 includes a base plate 66, a neck portion 68 and a head portion 70. The neck portion 68 includes a pair of notches 72 which form an intermediate length 73. The base plate 66 includes a pair of raised surfaces 74 positioned directly across from one another. The neck portion 68 and head portion 70 are integrally formed with the base plate 66 by being stamped or cut-out of the base plate 66 and then bent so as to extend generally perpendicularly from the base plate 66. Similarly, the raised surfaces 74 are formed by being stamped from the base plate 66. It will be appreciated, however, that the neck portion 68 and the raised surfaces 74 could be formed from independent components if desired. It will be appreciated then that the locking member 64 could take a variety of different designs provided some form of base plate and some form of neck portion are included.

With further reference to FIG. 3, each outer side rail 16 includes an outer wall 76, an inner wall 78 and a pair of overhanging ledge portions 80 which help to form a channel 82. The outer side rails are each supported on an optional mounting pad 84 and secured to the outer body surface 14 of the vehicle 12 (FIG. 1) via threaded screws in the conventional manner. Each outer side rail 16 is preferably roll-formed from a single piece of suitably strong material such as steel, but it could also be formed from multiple sections of material secured together with suitable fastening elements.

With further reference to FIGS. 3 and 7, it can be seen that the overhanging ledge portions 80 each include a plurality of spaced-apart notches 86. The notches 86 are adapted to engage with the raised surfaces 74 of the locking member 64 when the locking member 64 is urged into the locked position, as shown in FIG. 3. This feature of the present invention will be described more fully in the following paragraphs. It will also be appreciated that the notches 86 could alternatively be formed so as to extend completely through the overhanging ledge portions 80 if desired. It will also be appreciated that conventional side rails without notches could also be employed and still provide excellent securing of the cross bar 20 at a desired location along the side rails 16.

With further reference to FIGS. 3 and 6, the bracket member 24 also includes a biasing member 88. The biasing member 88, as shown in FIG. 6, is formed from a length of spring steel having a T-shaped cut-out 90 and a lip portion 92 resulting from the cut-out 90. The lip portion 92 includes a V-shaped section 92a for engaging with the head portion 70 of the locking member 64. The biasing member 88 is formed with a slight curvature to impart a biasing force on the locking member 64 when coupled to the locking member 64 and positioned within the recess 32.

Referring further to FIGS. 3 and 6, the intermediate length 73 of the locking member 64 engages within the T-shaped cut-out 90 of the biasing member 88 such that a portion 90a of the biasing member rests on shoulders 72a of the locking member 64. As the biasing member 88 is moved slightly longitudinally, the V-shaped portion 92a of the lip portion 92 slides over the head portion 70 such that the head portion 70 is captured in the V-shaped portion 92a, as shown in FIG. 7.

When the rotator 36 is in the "locked" position shown in FIG. 3, the base plate 66 is urged upwardly towards the overhanging ledge portions 80 such that the raised surfaces 74 engage within a corresponding pair of notches 86 of the ledge portions 80. When it is desired to reposition the cross bar 20 the rotator 36 is grasped with two or more fingers of a hand and rotated into an "unlocked" position. This causes the camming surface 62 to urge the head portion 70, and thus the entire locking member 64, downwardly against the biasing force of the biasing member 88. This causes the raised surfaces 74 to move out of engagement with the notches 86, as shown in FIG. 4.

When the rotator 36 is urged fully into the unlocked position, the head portion 70 and V-shaped lip portion 92a move into contact with the flat portion 62a of the camming surface 62. At this point the rotator 36 may be released and the flat portion 62a holds the locking member 64 in its unlocked position. While the rotator 36 is in the unlocked position, the entire bracket member 24 may be slid freely along its outer side rail 16 to a new desired position. Once the rotator is repositioned, the rotator 36 may be urged back into the locked position and the force provided by the biasing member 88 again urges the head portion 70 of the locking member 64 upwardly until the raised surfaces 74 engage within a new pair of notches 86. In this regard, it will be appreciated that if the raised surfaces 74 of the locking member 64 are not positioned directly underneath a pair of notches 86 that a further degree of slight longitudinal adjustment will be required of the bracket member 24 before the raised surfaces 74 will engage with a corresponding pair of notches 86.

The bracket members 24 of the vehicle article carrier 10 also form a gradually curving profile, as shown in FIG. 3, which is aerodynamically advantageous as well as aesthetically pleasing when the bracket members 24 are secured to their respective outer side rails 16. The rotator outer surface 48 remains substantially flush with the outer surface 28 of its bracket member 24 regardless of the rotational position of the rotator 36. Since each bracket member 24 is positively clamped to its associated side rail, there is virtually no wobble, vibration or other objectionable movement or noise generated as the vehicle travels over rough terrain, which may occur with prior developed article carrier systems.

The rotator 36 further allows the bracket member 24 to be quickly and easily clamped and unclamped from the outer side rails 16 to allow the cross bar 20 to be readily repositioned along the outer side rails 16 if repositioning of the cross bar 20 is needed. Securing of the brackets 24 to the outer side rails 16 is accomplished with a minimum number of moving component parts and without complex construction techniques. The bracket housing 26 is preferably molded from a suitable high-strength plastic. The locking member 64 is preferably formed from a single section of metal. The rotator 36 is also preferably molded from a single piece of suitably strong plastic.

Referring now to FIG. 11, there is shown a vehicle article carrier 100 in accordance with an alternative preferred embodiment of the present invention. The vehicle article carrier 100 is illustrated secured to the outer body surface 14 of the vehicle 12. A pair of outer side rails or slats 116 are fixedly mounted to the outer body surface 14. Optionally, intermediate slats 17 could also be secured to the outer body surface 14 to provide additional protection thereto.

The vehicle article carrier 100 also comprises adjustable cross bars 118 and 120. Each cross bar 118 and 120 is supported on the outer side rails 116 by a pair of bracket members 124 secured at the outermost ends 122 of each cross bar 118, 120. It will be appreciated, however, that while two adjustable cross bars are illustrated, that the vehicle article carrier 100 could just as easily incorporate one adjustable cross bar and one cross bar which is fixedly secured for non-adjustable movement to the outer side rails 116. In either event, the vehicle article carrier 100 is not limited to one configuration or the other.

With reference now to FIGS. 12–17, the locking and unlocking action provided by each bracket member 124 will be described. Initially, however, it will be understood that the bracket member 124 incorporates two components, a locking member and a biasing member, which are identical in construction to locking member 64 and biasing member 88, respectively, described in connection with the discussion of bracket member 24. Accordingly, the description of these components will not be repeated and they will be denoted by reference numerals 64 and 88, respectively.

With initial reference to FIGS. 12, 14 and 15 the bracket member 124 includes a housing 126 having an outer surface 128, an inner wall 130 and a bottom portion 131 (FIG. 15). The bottom portion 131 has an opening 133 through which the neck portion 68 of the locking member 64 protrudes. The outer surface 128 includes a hollowed out portion or recess 132. A lever member 134 is mounted partially within the recess 132. The lever member 134 has an outer surface 136 having a contour which blends in with the contour of the outer surface 128 of the housing 126 to provide a gradually curving, aerodynamically efficient and aesthetically pleasing appearance to the bracket member 124. A depression 164 (FIG. 14) is integrally formed in the outer surface 136 for allowing one or more fingers to be inserted therein and used to urge the lever member 134 rotationally between open and closed (i.e., unlocked and locked, respectively) positions.

With reference to FIG. 15, the inner wall 130 includes a mounting post 138 or section having a generally circular configuration, a bore 140 formed coaxially therethrough and a small recessed area 142 formed in a rear outer surface portion 144 thereof. The lever member 134 includes a boss portion 146 having a centrally disposed bore 148 and an annular support portion 150. The boss portion 146 is of a diameter permitting it to be inserted within a recessed area 152 of the mounting post 138 while the annular support portion 150 fits within a partial circumferential channel 154 formed around the mounting post 138. An external fastening element, in this instance a screw 156 having a portion of its shaft threaded, is inserted through the bore 140 and threadably engaged with the bore 148 to hold the lever member 134 to the mounting post 138. This permits rotational movement of the lever member 134 relative to the mounting post 138. The small recessed area 142 enables the head of screw 156 to be positioned slightly below the rear outer surface portion 144 so as not to protrude visibly therefrom.

With reference to FIGS. 15 and 16, the lever member 134 includes a camming surface 158 extending circumferentially about a portion of an interior surface 160 thereof. The camming surface 158 includes a lip portion 162 for limiting rotational travel of the lever member 134 in the open or unlocked direction. It will be appreciated, however, that a variety of other means could be substituted for the lip portion 162 to limit rotational movement of the lever member 134. Such means could include a protruding shoulder or tab formed on the inner wall 130 protruding into the recess 132. A lower inside edge surface 164a (FIG. 16) of the depression 164 abuts an upper surface 131a of the bottom portion 131 of the housing 126 to limit rotational movement of the lever member 134 in the locking direction.

As is also apparent from FIGS. 14 and 16, the housing 126 of the bracket member 124 includes a pair of integrally formed, T-shaped foot portions 166. The T-shaped foot portions 166 ride within the channel 82 of the outer side rail 116 to prevent the bracket member 124 from being lifted off of the outer side rail 116. The housing 126 of the bracket member 124, as well as the lever member 134, may each be formed from a variety of materials and are each preferably injection molded from a suitably high strength plastic.

Referring now to FIGS. 15 and 16, the locking member 64 can be seen in a locked position. With the lever member 134 in the locked (i.e., closed) position shown in FIG. 16, the camming surface 158 is positioned so as to just barely make contact with the biasing member 88. This permits the biasing member 88 to hold the locking member 64 in an elevated position such that raised surfaces 74 of the locking member 64 engage within a corresponding pair of notches 86 (FIG. 15) formed in the outer side rail 116. This engagement is identical to that described in connection with the embodiment of FIGS. 4 and 7. As the lever member 134 is rotated into the unlocked (i.e., "open") position shown in FIG. 17, the camming surface 158 bears down on the biasing member 88. This causes the entire locking member 64 to be urged downwardly such that the raised surfaces 74 of the locking member 64 become disengaged from an associated pair of notches 86 in the outer side rail 116. The lip portion 162 limits the rotational travel of the lever member 134 to a predetermined range. The entire bracket member 124 may then be moved slidably longitudinally along the outer side rail 116 to be repositioned as needed.

Referring now to FIGS. 18 and 19, a bracket member 200 in accordance with an alternative preferred embodiment of the present invention is shown. The bracket member 200 includes a recessed area 202 formed in a gradually curving outer side portion 204 into which a slide member 206 is inserted. The recess 202 is formed in part by an inner wall 208 having a flexible, protruding tongue portion 210 integrally formed therefrom and a base portion 212 having an opening 214 formed therein. The tongue portion 210 is formed so as to extend outwardly of the inner wall 208 and has a thickness providing it with a slight degree of flexibility. With brief reference to FIG. 21, the tongue portion 210 is illustrated in perspective with a portion of the inner wall 208.

With reference to FIGS. 19, 20 and 22, the slide member 206 has an outer surface 218 having a contour formed to blend in with the outer surface 204 of the bracket member 200 to provide an aerodynamically efficient, aesthetically appealing and integrally formed appearance. Integrally formed with the outer surface 218 is a raised portion 219 which is grippable with one or more fingers to enable the slide member 206 to be easily slid between locked and unlocked positions. The slide member 206 also includes an elongated slot 220 which is formed in a wall portion 222 thereof. It will be noted that slot 220 is not so deep as to extend completely through wall portion 222. A tapered notch 224 extends generally perpendicularly to the slot 220.

With specific reference to FIG. 22, the slide member 206 includes a longitudinal camming surface 226. Camming surface 226 includes a first portion 228 which corresponds to a "locked" position, an intermediate or second portion 230 which causes movement of the locking member 64 vertically when the slide member 206 is moved horizontally in the recess 202, and a third portion 232 which corresponds to an "unlocked" position.

With reference now to FIGS. 18 and 19, the slide member 206 is inserted in accordance with directional arrow 233 during assembly of the bracket member 200. As the slide member 206 is lowered into the recess 202, the tongue portion 210 engages within the notched portion 224 and is urged to the right in the drawing of FIG. 19 by the notch 224 as the slide member 206 moves into the recess 202. Just before the slide member 206 becomes fully inserted in the recess 202, the tongue portion 210 snappingly engages within slot 220. At this point the slide member 206 cannot be lifted out of the recess 202 but can be slid longitudinally in accordance with the length of slot 220. Accordingly, the length of slot 220 defines the maximum possible sliding travel of the slide member 206. Of course, it will be appreciated that the length of the recess 202 also limits the sliding longitudinal travel of the slide member 206.

With reference to FIGS. 19 and 23, the slide member 206 is shown in its locked position. The first portion 228 of the camming surface 226 is just barely engaged with the biasing member 88. The raised surfaces 74 of the locking member 64 are engaged within a corresponding pair of notches 86 in the outer side rail 116. In this regard it will be appreciated that the construction of the locking member 64, the biasing member 88 and the outer side rail 116 are identical to that previously described herein. In this position the bracket member 200 cannot be moved longitudinally along the outer side rail 116.

Referring to FIGS. 24 and 25, as the slide member 206 is moved slidably to the right in the drawing of FIG. 25, the camming surface 226 urges the biasing member 88, and therefore the locking member 64, downwardly to cause the raised surfaces 74 to become disengaged from the notches 86. Portion 232 of the camming surface 226 allows the locking member 64 to be held in its unlocked position against the biasing force of biasing member 88 even if the operator releases the slide member 206. In this position the bracket member 206 can be repositioned at a new, desired position along the outer side rail 116.

Referring now to FIG. 26, a bracket member 300 in accordance with another alternative preferred embodiment of the present invention is shown. It will be appreciated that bracket member 300 is similar to the bracket member 200 and like components are denoted in FIGS. 26 and 27 by reference numerals corresponding to those used in FIGS. 18–25 but increased by 100. The bracket member 300 differs from the bracket member 200 only in that the tongue portion 210 has been omitted and a slot 340 (FIG. 27) formed in place thereof in the inner wall 308 of the housing 304, and also by a bore 344 formed in the wall portion 322 in place of the slot 220. The slot 340 cooperates with an external fastening element 342 threadably engaged in the bore 344 to hold the slide member 306 in the recess 302. All other operational features are identical to those described in connection with the bracket member 200 of FIGS. 18–25. With specific reference to FIG. 27, the overall length of the slot 340 defines the maximum length of sliding travel of the slide member 306.

During assembly, the slide member 306 is lowered into the recess 302 and then the external fastening element 342 is threadably engaged in the bore 344. The locking and unlocking action is identical to that described in connection with FIGS. 18–25.

Referring now to FIGS. 28 and 29, alternative preferred embodiments of the outer side rail 116 are illustrated. With regard to FIG. 28, the outer side rail 400 includes a pair of inwardly depending lip portions 402 which each include a plurality of spaced apart notches 404. With brief reference to FIG. 29, another outer side rail 500 is shown having lip portions 502. The lip portions 502 each have notches 504 formed in spaced-apart fashion. The embodiments 400 and 500 illustrate that the notches incorporated in the outer side rails 116 of the present invention could be placed in a variety of positions without requiring significant modification of the raised surfaces 74 of the locking member 64. In some instances, no modification whatsoever of the locking member 64 may be needed.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A vehicle article carrier for supporting articles above an outer body surface of a vehicle, said vehicle article carrier comprising:

a pair of slats adapted to be secured to said outer body vehicle surface and extending along said outer body vehicle surface generally parallel to one another, each said slat including a channel extending along at least a major portion of the length thereof;

at least one cross bar having a length sufficient to span between said slats when positioned over said slats generally perpendicularly to each said slat;

at least one bracket member secured to each end of said cross bar for supporting said cross bar elevationally above said slats and said outer body vehicle surface, each said bracket member comprising:

a housing having a recess and a base portion, said base portion having an opening formed therein;

a locking member projecting from said base portion and having a neck portion extending through said opening into said recess, said neck portion being moveable in the direction of said opening;

a biasing member operably associated with said locking member for urging said locking member into a locked position relative to an associated one of said slats; and a manually engageable actuator positioned at least partially within said recess and moveable relative to said housing by one or more fingers of a hand of a user;

said actuator including a camming surface adapted to urge said locking member outwardly of said base portion against a biasing force provided by said biasing member when said actuator is moved in a first direction, to thereby place said locking member in an unlocked position relative to said associated one of said slats, and to allow said biasing member to urge said locking member into a locked position relative to said associated one of said slats when said actuator is moved in a second direction opposite to said first direction.

2. The vehicle article carrier of claim 1, wherein said actuator comprises a rotator and wherein said housing comprises a mounting post positioned within said recess, said rotator being secured to said mounting post for rotational movement of said rotator; and wherein said rotator includes a circumferential camming surface for urging said neck portion of said locking member outwardly of said recess to place said locking member in said unlocked position.

3. The vehicle article carrier of claim 1, wherein said actuator comprises a lever shaped to aesthetically blend with an outer curvature of said housing and said cross bar when said lever is in a closed position; and said housing further comprising a mounting post to which said lever is coupled for rotational movement.

4. The vehicle article carrier of claim 1, wherein said actuator comprises a slide member disposed at least partially within said recess for longitudinal sliding movement therein;

said slide member including a camming surface for urging said locking member against said biasing force of said biasing member into an unlocked position when said slide member is moved longitudinally into an unlocked position, and for enabling said biasing member to urge said locking member back into said locked position when said slide member is moved in a second longitudinally opposite direction into the locked position.

5. The vehicle article carrier of claim 1, wherein said locking member includes a base plate having dimensions enabling it to reside within said channel of said associated one of said slats and to be moved slidably within said channel;

each said slat including a plurality of spaced-apart notches formed therein; and said base plate including at least one raised surface adapted to engage within one of said notches and said associated one of said slats when said actuator is urged manually into said locked position, said engagement of said raised portion within one of said notches preventing said locking member from moving slidably within said associated one of said slats.

6. A vehicle article carrier of claim 1, wherein said actuator member includes an outer surface which is generally flush with an outer surface of said housing of said bracket member and at least one portion graspable with one or more fingers of a hand of a user to enable movement of said actuator.

7. The vehicle article carrier of claim 1, wherein said locking member includes a head portion at an upper end of said neck portion which is operably coupled to said biasing member and also operably coupled to said camming surface.

8. The vehicle article carrier of claim 1, wherein said biasing member comprises a length of curved spring steel having a cut-out for engaging with said locking member.

[%<]bold9. A vehicle article carrier for supporting vehicles above an outer body surface of a vehicle, said vehicle article carrier comprising:

a pair of slats adapted to be secured to said outer body vehicle surface and extending along said outer body vehicle surface generally parallel to one another, each said slat further including a channel formed therein and extending along at least a major portion of the length thereof;

at least one cross bar having a length sufficient to span between said slats when positioned over said slats generally perpendicularly to each said slat;

at least one bracket member secured to each end of said cross bar for supporting said cross bar elevationally above said slats and said outer body vehicle surface, each said bracket member comprising:

a housing having a recess, a mounting post positioned within said recess and a base portion having an opening formed therein;

a locking member projecting from said base portion and having a neck portion extending through said opening into said recess, said neck portion being moveable in the direction of said opening;

a biasing member interposed between said locking member and an interior surface of said housing; and a manually engageable lever member positioned at least partially within said recess and having an outer surface having a contour which generally aesthetically blends with an outer surface of said housing of said bracket member and an outer contour of said cross bar to provide an aesthetically pleasing appearance when said lever member is in a closed position relative to said housing;

said lever member having a portion engageable with one or more fingers of a hand of a user and being secured to said housing for rotational movement;

said lever member further including a circumferential camming surface adapted to cammingly urge said locking member outwardly of said base portion against a biasing force provided by said biasing member when said lever member is rotated in a first direction, to thereby place said locking member in an unlocked position relative to an associated one of said slats, and to allow said biasing member to urge said locking member into a locked position relative to said associated one of said slats when said lever member is rotated in a second direction opposite to said first direction.

10. The vehicle article carrier of claim 9, wherein said portion of said lever member comprises a depression formed in said lever member facilitating movement of said lever member by one or more fingers.

11. The vehicle article carrier of claim 9, wherein said lever member is rotatable within a plane diverging from said outer body surface of said vehicle and generally tangential to said outer surface of said housing of said bracket member.

12. The vehicle article carrier of claim 9, wherein said locking member includes a base plate having a pair of raised surfaces formed thereon;

wherein said one of said associated slats includes a plurality of notches formed therein; and said pair of raised surfaces engaging with a respective pair of said notches when said lever member is rotated into said closed position such that said locking member cannot move slidably within said channel of said one associated said slats.

13. A vehicle article carrier for supporting articles above an outer body surface of a vehicle, said vehicle article carrier comprising:

a pair of slats adapted to be secured to said outer body vehicle surface generally parallel to one another, each said slat including a channel extending along at least a major portion of the length thereof;

at least one cross bar having a length sufficient to span between said slats when positioned over said slats generally perpendicularly to each said slat;

at least one bracket member secured to each end of said cross bar for supporting said cross bar elevationally above said slats and said outer body vehicle surface, each said bracket member comprising:

a housing having a recess and a base portion, said base portion having an opening formed therein in communication with an interior area of said housing;

a biasing member disposed within said interior area;

an inverted T-shaped locking member having a neck portion extending through said opening, said neck portion being operably associated with said biasing member and moveable linearly within said opening, said locking member further having a clamping portion adapted to reside within said channel of an associated one of said slats;

a rotatable actuating member disposed at least partially within said recess, said actuating member having a camming surface in communication with said neck portion of said T-shaped locking member for cammingly urging said clamping portion out of engagement with said locking member when said actuating member is moved into an open position, and for allowing said biasing member to urge said clamping portion back into locking engagement with said associated slat when said actuating member is moved into a closed position.

14. A vehicle article carrier for supporting articles above an outer body surface of a vehicle, said vehicle article carrier comprising:

a pair of slats adapted to be secured to said outer body vehicle surface generally parallel to one another, each said slat including a channel extending along at least a major portion of the length thereof;

at least one cross bar having a length sufficient to span between said slats when positioned over said slats generally perpendicularly to each said slat;

at least one bracket member secured to each end of said cross bar for supporting said cross bar elevationally above said slats and said outer body vehicle surface, said bracket member comprising:

a housing having a base portion, said base portion having an opening therethrough;

a biasing member;

an inverted T-shaped locking member having a neck portion extending through said opening and a clamping portion formed at an end of said neck portion, said biasing member being associated with said neck portion and said locking member being moveable generally linearly between locked and unlocked positions, said clamping portion being formed so as to be slidable within said channel of its associated slat and to clampingly engage an interior area of said slat when disposed in said locked position; and a rotatable actuating member secured to said housing for rotational movement between locked and unlocked positions, said actuating member having a camming surface in communication with said neck portion of said locking member and operable to urge said locking member between said unlocked and locked position against said biasing member, said biasing member further operating to apply a continuous biasing force tending to urge said locking member into said locked position and to return said locking member to said locked position.

* * * * *

UNITED STATES PATENT AND TRADEMARK OFFICE
CERTIFICATE OF CORRECTION

PATENT NO. : 5,794,827
DATED : August 18, 1998
INVENTOR(S) : John S. Cucheran et al.

It is certified that error appears in the above-identified patent and that said Letters Patent is hereby corrected as shown below:

Column 3,
Line 40, delete "and"
Line 51, after "showing" insert -- the --

Column 4,
Line 42, delete "across" and substitute -- cross -- therefor

Column 12, claim 9,
Line 18, delete "[%<]bold"
Line 18, "vehicles" and substitute -- articles -- therefor Column 14, claim 14,
Line 21, delete "comprising;" and substitute -- comprising: -- therefor Signed and Sealed this Twenty-third Day of October, 2001

Attest:

NICHOLAS P. GODICI
Attesting Officer    Acting Director of the United States Patent and Trademark Office